Sept. 22, 1964 S. I. RAMBO 3,150,331

TRAVELING WAVE TUBE PHASE COMPENSATION CIRCUIT

Filed Oct. 15, 1962

INVENTOR.

S. I. Rambo,

BY

H. H. Losche

Att'ys.

3,150,331
Patented Sept. 22, 1964

3,150,331
TRAVELING WAVE TUBE PHASE COMPENSATION CIRCUIT

Sheldon I. Rambo, Baltimore, Md., assignor, by mesne assignments, to the United States of America as represented by the Secretary of the Navy
Filed Oct. 15, 1962, Ser. No. 230,768
6 Claims. (Cl. 332—7)

This invention relates to traveling-wave tube circuits and more particularly to traveling-wave tube amplifiers for radio frequency signals which include circuitry to compensate for traveling-wave tube cathode voltage droop tending to produce phase change of the radio frequency signals amplified by the tube.

Pulsed transmitters utilizing grid controlled traveling-wave tube amplifiers for radar use and the like exhibit excessive phase shift during the pulse for certain applications such as pulsed doppler and Moving Target Indicators. If the cathode of the traveling-wave tube (TWT) could be held exactly constant during the grid pulse, there would be no phase change of the radio frequency (RF) through the tube during the RF pulse. It is never practical to hold this cathode voltage constant and the cathode therefore droops with the time constant of a capacitor normally connected to the cathode and the cathode-to-shell or anode resistance. These cathode capacitors must, of necessity, be large and, theoretically at least, many microfarads could be used to hold the cathode voltage constant by brute force. The impracticability of holding the cathode voltage constant motivates solutions to compensate for the cathode voltage droop which droop becomes accepted as inherently necessary in TWT amplifier operation. Most radar systems could not tolerate more than about 5° phase shift of the RF during the pulse so that the droop in cathode voltage must be held to less than 100 volts out of 25,000 volts, or .4%, or else phase compensation must be applied. Physically large cathode capacitors are required to prevent cathode voltage droop in excess of this very small value and in most cases this method is not completely satisfactory or practical.

In this invention a TWT of the type having a grid control is used as an RF amplifier. The shell of the TWT is connected to a fixed potential such as ground and the cathode and collector terminals are coupled across a high negative voltage source. The grid of the TWT is modulated by substantially square wave pulses and this modulating circuit has a network therein which produces a droop in the lobe portion of the modulator pulses which droop will compensate for the droop in cathode voltage of the TWT to prevent phase shift in the RF signals amplified in the helix of TWT. The droop of the lobe portion of the modulator pulses is adjustable in the droop producing network so that the grid voltage droop may be adjusted to exactly compensate proportionally for cathode voltage droop in the TWT necessary to maintain the RF phase unchanged. It is accordingly an object of this invention to provide grid modulator voltage control to compensate for cathode voltage droop of a grid controlled TWT sufficient to eliminate phase change of RF signals being amplified in the TWT.

These and other objects and the attendant advantages, features, and uses may become more apparent to those skilled in the art as this description proceeds when considered along with the accompanying drawing in which.

Figure 1:
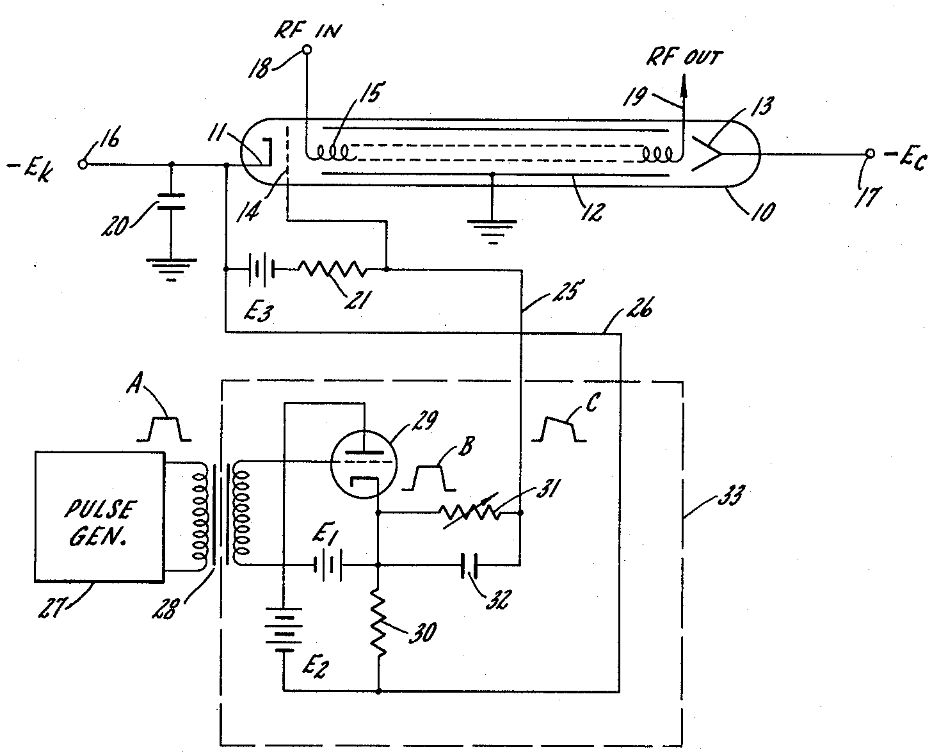
FIGURE 1 is a circuit schematic diagram of a TWT and grid modulator incorporating the grid voltage droop control network.

Referring more particularly to FIGURE 1, there is illustrated a TWT 10 having a cathode 11, a shell or anode 12, a collector 13, a grid 14, and a helix 15. The cathode 11 is coupled to a high negative voltage source E*k* at terminal 16, the collector 13 is coupled to a negative voltage source E*c* at terminal 17, and the shell or anode 12 is coupled to a fixed voltage source, herein illustrated to be ground. The RF signals to be amplified are connected to the terminal 18 of the helix 15, the output of helix 15 delivering the amplified RF signals on the conductor 19. The cathode 11 is coupled to one plate of a capacitor 20, the other plate of which is coupled to the fixed potential such as ground. The grid 14 of the TWT is biased with respect to the cathode 11 by a direct current voltage source E3 through a resistor 21 to normally maintain the TWT in a cutoff or quiescent state. In the normal operation of the TWT 10, a grid modulator producing positive pulses on the grid 14 would place the TWT 10 in a conductive state for the duration of the grid pulse which would cause amplification of an RF signal connected to the helix 15. In prior known devices, where a TWT such as 10 is used in the amplification of RF signals, the pulse conduction of the TWT 10 would cause a droop in cathode voltage from the —E*k* voltage which would produce a phase lag in the RF signals. This cathode droop can be reduced somewhat by increasing the size of the capacitor 20 or by increasing the number of capacitors 20 to increase the capacity thereof but it is quite impractical to do so. It has been found that where the —E*k* voltage is approximately 25,000 volts, a droop of approximately 1,000 volts will cause approximately a 50° phase shift in the RF signals. This is more clearly shown in FIGURE 2 where the phase sensitivity of this TWT tube 10 is about —.050° per volt change of cathode voltage. Such a phase change is intolerable for most RF frequency systems, such as radar or the like.

Figures 2, 3:
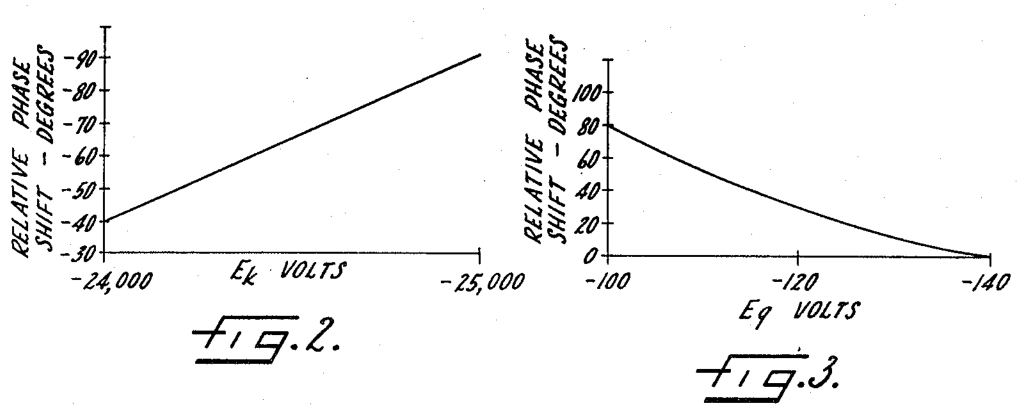
FIGURE 2 is a graph of the degrees of phase shift of the RF signal with respect to cathode voltage changes of an ordinary TWT.
FIGURE 3 illustrates in a graph the relative phase shift of the RF signal amplified in a TWT with respect to grid voltage changes.

In the present invention it was found that a variation of the grid-to-cathode voltage (E*g*) produces a phase shift of the RF through the TWT opposite in direction to the phase shift produced by cathode voltage change. As shown in FIGURE 3 the phase sensitivity of a typical transmitting TWT is about +20° per volt change in cathode voltage. Since, as seen in FIGURE 2, the phase change per cathode volt is —0.05°, a one volt change in grid voltage, as seen in FIGURE 3, will compensate for a 40 volt change in cathode-to-shell or anode voltage of the TWT. Expressed in percentages a 2% cathode-to-shell pulse droop can be compensated by approximately 10% grid-cathode pulse droop.

In the present invention a grid modulator coupled by the conductors 25 and 26 to the grid 14 and cathode 11, respectively, of the TWT 10 provides grid pulses that have the lobe portions thereof adjustably drooped to compensate proportionally for cathode voltage droop of the TWT 10. The grid modulator includes a pulse generator 27 that produces substantially trapezoidal waves illustrated by A, the output of which is transformer coupled through a high voltage isolation transformer 28 to the grid of a triode 29. The grid of the triode 29 is biased with respect to its cathode by a direct current voltage source, illustrated herein as E1, through the secondary winding of transformer 28. Anode voltage for the triode 29 is supplied by a direct current voltage source E2. The cathode of triode 29 is biased through a cathode resistor 30, the triode 29 being operative as a cathode follower tube in which the trapezoidal wave A is substantially reproduced as B on the cathode of triode 29. The cathode of triode 29 is coupled through a parallel network consisting of a variable resistor 31 and a capacitor 32 to the cathode terminal conductor 25. The parallel network 31, 32 produces a variable time constant of the trapezoidal wave B to produce the wave C illustrating a droop of the lobe portion as applied to grid 14 of TWT 10. The pulse generator 27 operates at ground potential and conducts the pulses A through the high voltage isolation transformer 28 to the tube circuit 29 of the grid modulator which substantially floats at potentials applied thereto as illustrated within the broken line box 33.

*Operation*

In the operation of this device, let it be assumed that RF signals being amplified are applied to terminal 18 of the TWT 10, the output of which is taken from the conductor 19 of the TWT. The RF signals could either be pulsed or continuous but it is to be understood that, if the RF signals are pulsed, the pulse generator 27 should be synchronized to produce the grid pulses coincident with the RF pulses, as is well understood by those skilled in the art. Pulse generator 27 producing pulses A applies these pulses through the high voltage isolation transformer 28 to the grid of the cathode follower 29 which operates as a "bootstrap" tube circuit to produce corresponding pulses B across the cathode resistor 30. It is to be understood that the cathode resistor 30 is coupled to the $-Ek$ voltage through the conductor 26 and that voltage E2 substantially floats the anode voltage of the cathode follower 29 positive with respect to the cathode thereof and that the grid of the cathode follower 29 floats at a voltage sufficiently negative with respect to the cathode by the voltage E1 to normally cut off this tube. Pulses B, being reproduced pulses in the same polarity relation as pulses A, are applied through the parallel network 31, 32 to produce the corresponding pulses C on the grid 14 of the TWT. The leading edge of each pulse C will trigger the TWT 10 into conduction which will produce high cathode conduction and thereby cause a normal droop in the $-Ek$ voltage with respect to the anode or shell 12 voltage. At the same time, the parallel RC droop control network 31, 32 produces a voltage droop in the lobe portion of pulse C thereby causing a droop in grid voltage of grid 14 which will compensate proportionally for the droop in $-Ek$ voltage to eliminate any change in phase of the RF signals amplified through the helix 15. If any phase change exists in the RF signal voltage, the variable resistor 31 may be readjusted to change the droop in the lobe portion of pulses C to exactly compensate for the droop in $-Ek$ voltage on the cathode 11 tending to produce the phase change of the RF voltage. In this manner where RF voltage signals are amplified in a grid controlled TWT, such as 10, and phase change results, these phase changes may be compensated in the grid modulator circuit as illustrated in FIGURE 1 herein. It is to be understood that the schematic circuit of the grid modulator is merely one illustration of many different types of grid modulator circuits that could be used, it only being necessary that an RC timing circuit, such as the parallel network 31, 32, or other means of accomplishing time-voltage change be used to produce a droop in the grid pulse voltages to compensate for the cathode voltage droop. Accordingly, the grid modulator circuit is illustrated herein for the purpose of showing the operability of controlling grid pulse droop to compensate for cathode voltage droop of TWT.

While many modifications and changes may be made in the constructional details and features of this invention, and particularly in the use of other grid modulator circuits with grid lobe droop control, I desire to be limited in the spirit and scope of my invention only by the scope of the appended claims.

I claim:

1. A traveling-wave tube compensating circuit comprising:

a traveling-wave tube having a cathode and a collector with a voltage supply coupled thereto, a grid with a bias thereon to normally cut off tube conduction, and a helix therein for conducting radio frequency signals from an input to an output thereof; and a grid modulator coupled to the grid of said traveling-wave tube through an adjustable network to apply substantially square modulating waves with drooped lobe portions thereof to said grid, the droop of said lobe portions being under the control of said adjustable network to compensate for cathode voltage droop tending to change the phase of said radio frequency signals.

2. A traveling-wave tube compensating circuit as set forth in claim 1 wherein said droop of said lobe portions being adjustable is by passing said substantially square modulating waves through a resistance and capacitance parallel network constituting said adjustable network, one element of which is adjustable to adjust said droop.

3. A traveling-wave tube compensating circuit as set forth in claim 2 wherein said grid modulator includes a cathode follower having substantially trapezoidal pulses applied to the grid thereof and said parallel resistance and capacitance network coupled to the cathode thereof.

4. A traveling-wave tube compensating circuit comprising:

a traveling-wave tube having a cathode, an anode, and a collector with a voltage supply coupled thereto, a grid with a bias thereon to normally cut off tube conduction, and a helix therein conductive of radio frequency signals from an input to an output thereof;

a capacitor having one plate coupled to the cathode of said traveling-wave tube and the other plate coupled to a fixed potential;

a generator of positive substantially trapezoidal shaped pulses; and an adjustable network coupled to receive said trapezoidal shaped pulses and coupled to the grid of said traveling-wave tube to cause conduction of said traveling-wave tube during said pulses, said adjustable network being capable of adjusting droop in the lobe portion of each of said trapezoidal shaped pulses whereby said adjustable network can be adjusted to compensate in grid voltage droop for cathode voltage changes of said traveling-wave tube tending to alter the phase of said radio frequency signals.

5. A traveling-wave tube compensating circuit as set forth in claim 4 wherein said adjustable network includes a resistor and a capacitor in parallel, one of which is adjustable to vary the degree of droop on said lobe portion of said trapezoidal shaped pulses.

6. A traveling-wave tube compensating circuit comprising:

a traveling-wave tube having a cathode, an anode, and a collector with voltage supply coupled thereto, a grid with a voltage bias thereon to normally cut off tube conduction, and a helix therein conductive of radio frequency signals from an input to an output for amplification thereof;

a capacitor having one plate coupled to the cathode of said traveling-wave tube and the other plate coupled to a fixed potential to stabilize said cathode voltage;

a pulse generator of positive susbtantially trapezoidal shaped pulses;

a cathode follower tube circuit having the cathode thereof coupled to the cathode of said traveling-wave tube and the anode and grid supplied anode voltage and grid bias voltage with respect to said cathode voltage and having said grid coupled to said pulse generator; and a parallel resistance-capacitance network coupled to the cathode of said cathode follower and the grid of said traveling-wave tube, said resistance being adjustable whereby pulses generated by said pulse generator and conducted through said cathode follower tube circuit to said traveling-wave tube grid are adjustable by said adjustable resistance to produce droop in the lobe portion of each of said trapezoidal shaped pulses to compensate for cathode voltage droop of said traveling-wave tube tending to change the phase of radio frequency signals amplified in said traveling-wave tube.

References Cited in the file of this patent

UNITED STATES PATENTS

| | | |
|---|---|---|
| 2,445,618 | Hutcheson | July 20, 1948 |
| 2,750,530 | Welsh et al. | June 12, 1956 |
| 2,919,374 | Harrison | Dec. 29, 1959 |